May 12, 1970   J. G. JOHANSKI, JR   3,510,944
GIANT CHEESE BLOCK HANDLING AND CUTTING MACHINE
Filed July 25, 1967   5 Sheets-Sheet 1
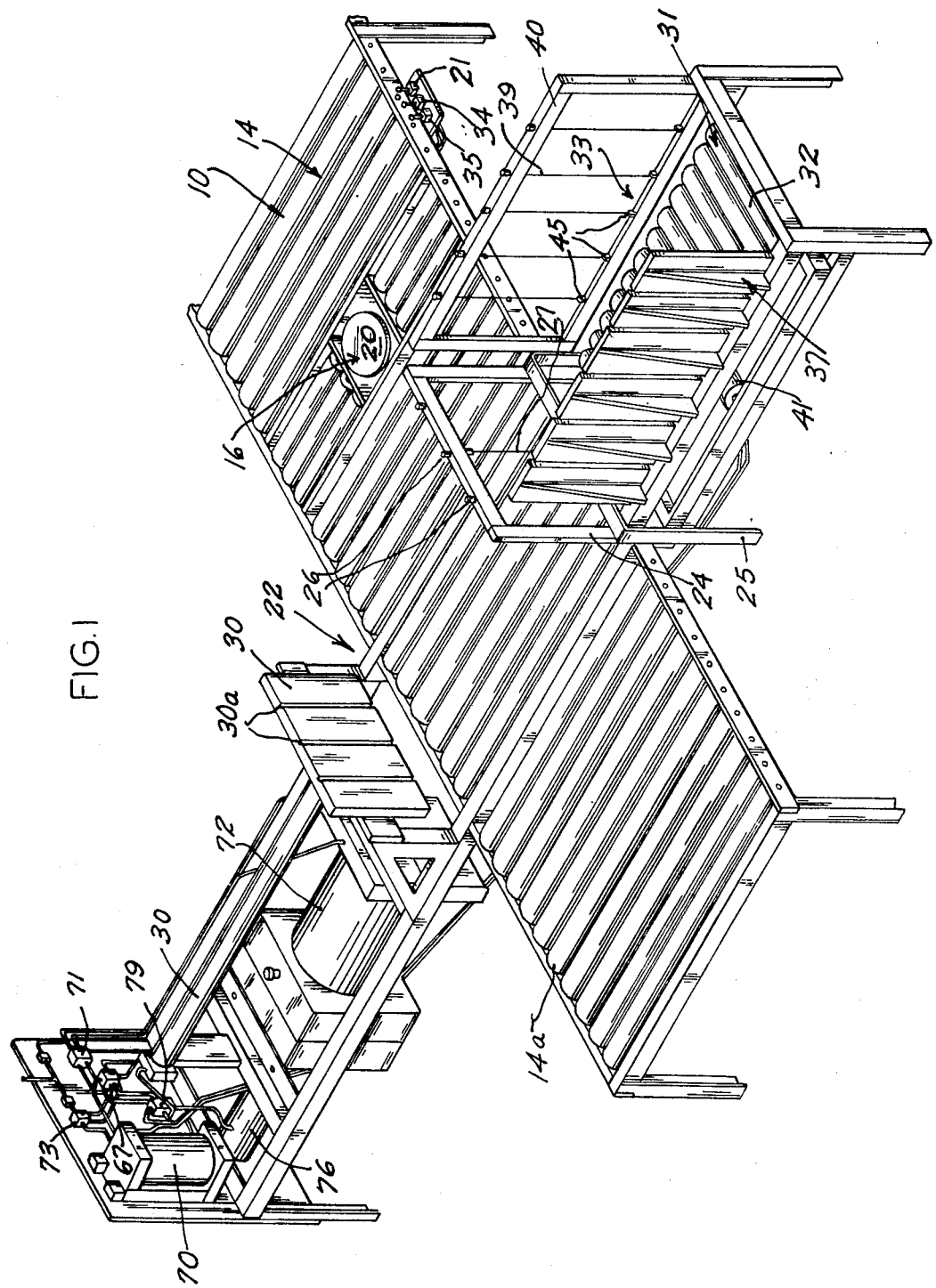
INVENTOR
James G. Johanski, Jr.
BY *[signature]*
ATTORNEYS INVENTOR
James G. Johanski, Jr.

May 12, 1970  J. G. JOHANSKI, JR  3,510,944
GIANT CHEESE BLOCK HANDLING AND CUTTING MACHINE
Filed July 25, 1967  5 Sheets-Sheet 4

INVENTOR
James G. Johanski, Jr.
BY *Hill, Sherman, Meroni, Gross & Simpson*
ATTORNEYS May 12, 1970     J. G. JOHANSKI, JR     3,510,944
GIANT CHEESE BLOCK HANDLING AND CUTTING MACHINE
Filed July 25, 1967     5 Sheets-Sheet 5

INVENTOR
James G. Johanski, Jr.

BY *[signature]*     ATTORNEYS

United States Patent Office 3,510,944
Patented May 12, 1970

3,510,944
GIANT CHEESE BLOCK HANDLING AND
CUTTING MACHINE
James G. Johanski, Jr., Green Bay, Wis., assignor to
Safeway Stores, Incorporated, Oakland, Calif., a corporation of Maryland
Filed July 25, 1967, Ser. No. 655,926
Int. Cl. A01j 23/00
U.S. Cl. 31—23
20 Claims

ABSTRACT OF THE DISCLOSURE

The present invention relates to methods of and apparatuses for handling and cutting cheese or other semi-soft material. The method includes the steps of forming a molded giant cheese block in a cheese mold having a liner of film such as a synthetic plastic film at one plant and closing the mold, shipping the molded cheese in the cheese mold to a packaging plant after the cheese has been cured, removing end covers from opposite ends of a cheese mold having a giant cheese block therein and cutting film strips off opposite ends of the giant cheese block, forcing the giant cheese block from the mold while longitudinally cutting the film along top and bottom sides of the block and cutting the block into elongated cheese pieces along the longitudinal lines of the cut of the film, stripping the exposed film from the top and adjacent sides of the cut pieces, supporting the elongated cheese pieces at one side against movement, and transversely cutting the cheese pieces while cutting the film at a bottom side of the pieces thereby dividing the pieces into smaller cheese blocks of approximately the same size. The present invention further relates to a giant cheese block mold stripper and block cutter for removing a mold from a giant cheese block and for longitudinally cutting the block and for then transversely cutting the block to divide the giant cheese block into smaller cheese blocks of approximately the same size.

BACKGROUND OF THE INVENTION

Field of the invention

In the cheese handling and packaging industry it has been the practice for cheese makers to mold cheese by filling a mold lined with an impervious film, to remove the mold and then cut the molded cheese into suitable sizes such as 40 pound blocks, and then to wrap the blocks and store the blocks for curing. Upon reaching curing date the wrapped blocks are shipped to another plant where the blocks are unwrapped for cutting the blocks into consumer sized units and for packaging these units. Constant efforts have been made for the purpose of reducing the production and handling costs of cheese in order that the ultimate price of the product to the consumer can be maintained as low as possible.

SUMMARY OF THE INVENTION

The present invention is concerned with a new method and machine for handling and cutting cheese which permits certain steps formerly practiced to now be eliminated.

According to the present invention the cheese is molded in giant sized blocks at a cheese factory by lining the mold with an imprevious film and then filling the mold with cheese curd. After the whey is drained from the cheese cured the impervious film is closed over the open ends to encase the curd. Covers are then fastened to the open ends of the mold by means of spring steel, coils or bands, and the mold is then stored for curing. Upon reaching the curing date the mold is removed from storage and shipped to a packaging plant, where the mold and the film are then stripped from the giant sized block and the block is contemporaneously cut, first longitudinally and then transversely, into properly sized blocks such as 40 pound blocks whereup the cut blocks are moved into the packaging line and are first cut into consumer sized units and then packaged according to conventional techniques.

By handling the cheese in the new manner just described, it is no longer necessary for the cheese maker to wrap and pack cut blocks, and it is no longer necessary for the cheese packager to unpack and unwrap the cut blocks on receipt from the cheese maker, whereby very substantial savings are achieved. In addition, because of the improved handling techniques just described, far less cheese is scrapped since by handling the cheese a reduced number of times cheese spoilage is substantially reduced. With the new method the giant cheese is stored in the giant cheese mold and the ends of the mold are closed by mold covers in such a way that the cheese is not exposed to air and contamination. With the former technique where the cheese was removed from the mold and then cut and wrapped at one point and then unpacked and unwrapped at a second point, cheese losses were much greater due to the additional handling and exposure of the product to atmosphere and contamination.

It is therefore an object of this invention to provide a new and improved method of handling cheese whereby the costs of handling and packaging can be substantially reduced.

It is a further object of this invention to provide a new method and apparatus for handling cheese whereby the cheese may be maintained in better condition as a result of being handled fewer times and being exposed to less contamination so that scrap loss can be substantially reduced.

According to certain features of my invention, I have provided a giant cheese block mold stripper and cutter which includes a transverse conveyor comprising rollers for receiving the cheese molds having molded cheese therein. Means is further provided for revolving the cheese molds relative to the transverse cutter to permit the end covers on the mold to be removed and to permit slits to be made in the film which encases the cheese. The machine further includes first backup means cooperable with one end of the cheese mold and a ram for forcing the molded cheese from the mold from its opposite end, discharging the cheese onto a longitudinal conveyor. Prior to discharge of the cheese onto the conveyor a cheese cutter means is employed for cutting the molded cheese as it emerges from the cheese mold and is deposited on the conveyor. A second backup means is employed at one side of the longitudinal conveyor, and it coacts with one side of the cheese pieces previously cut and cooperates with a transverse cheese cutter means that is positioned at an opposite side of the cheese pieces and is movable upon actuation of power means, whereby the transverse cheese cutter means cuts the cheese pieces into cheese blocks.

According to still further features of this invention, I have developed film cutter means which are cooperable with the cheese cutters to cut the film to permit the cheese cutters to cut the film to permit the cheese cutters or wires to move freely through the cheese.

Other objects and features of this invention will more fully become apparent in view of the following detailed description taken in conjunction with the accompanying drawings illustrating a single embodiment and in which:

FIG. 1 is an isometric view of a giant cheese block mold stripper and block cutter;

3

Figure 3:
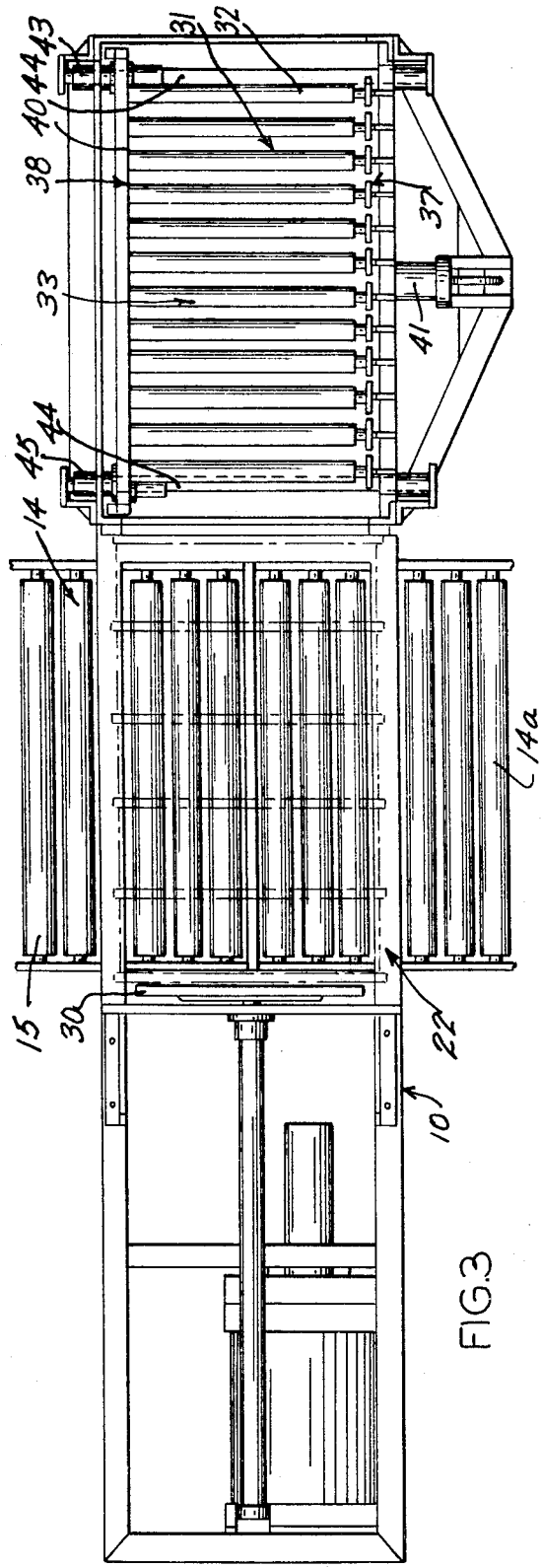
Figure 2:
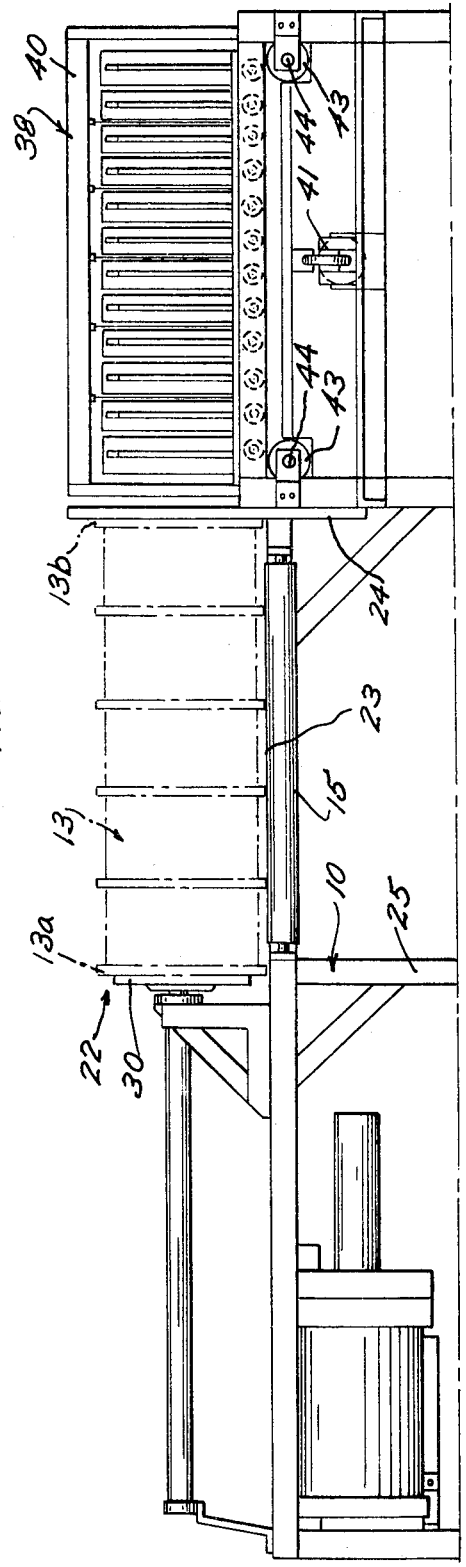
FIG. 2 is a side view of the machine shown in FIG. 1 with a mold illustrated in dotted lines in position for removal of the giant cheese block from the mold.
Figure 4:
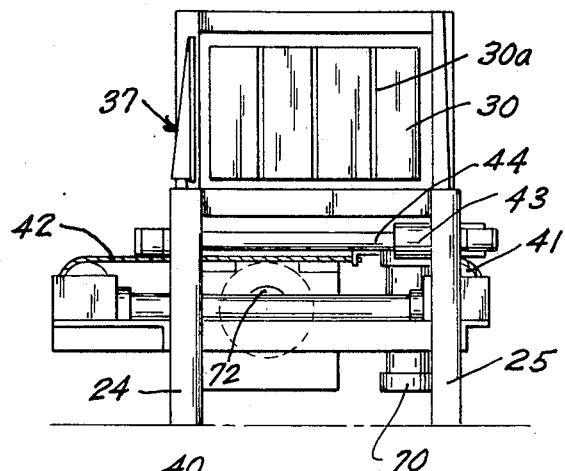
Figure 5:
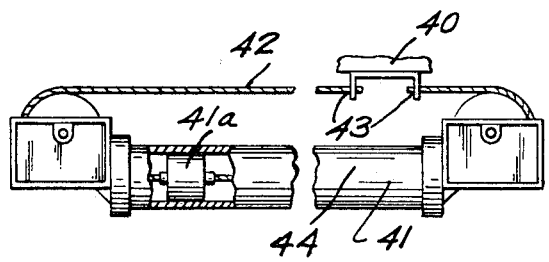
Figure 6:
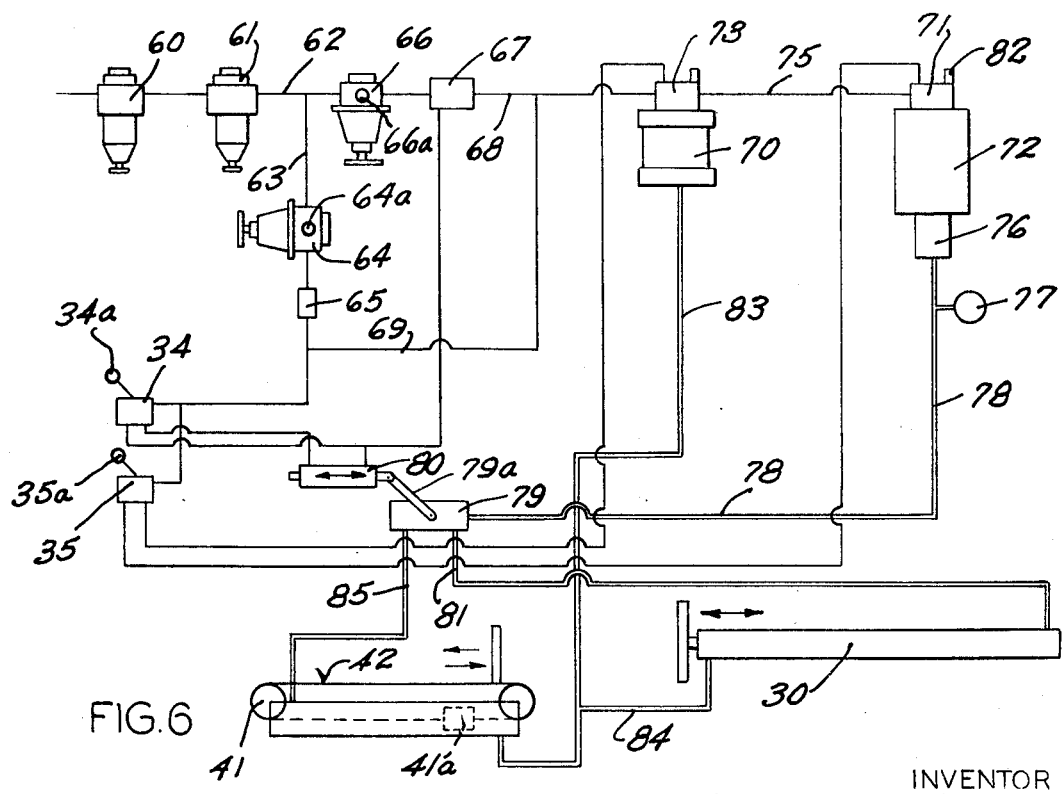
Figure 7:
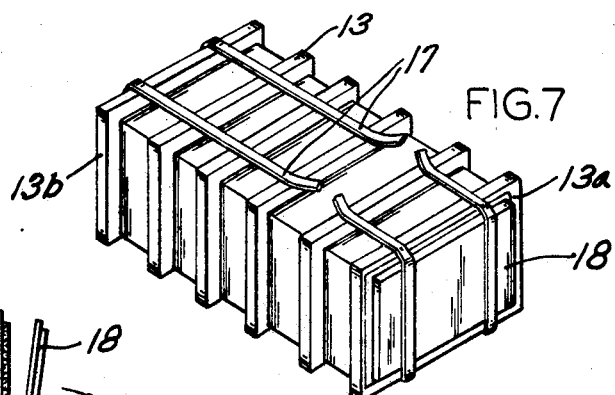
Figure 8:
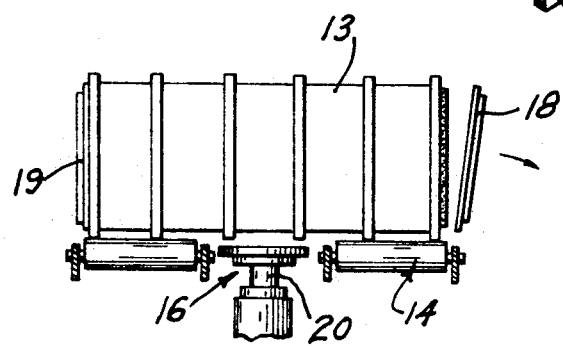
Figure 9:
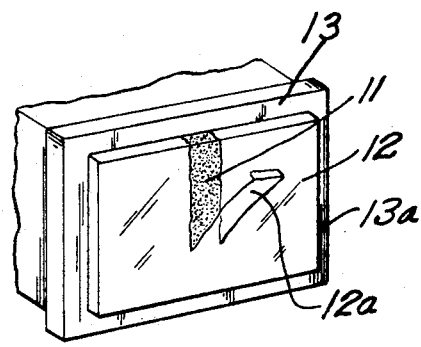
Figure 10:
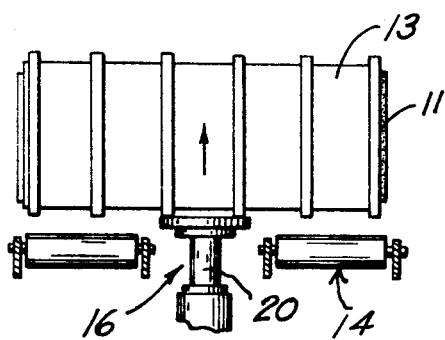
Figure 12:
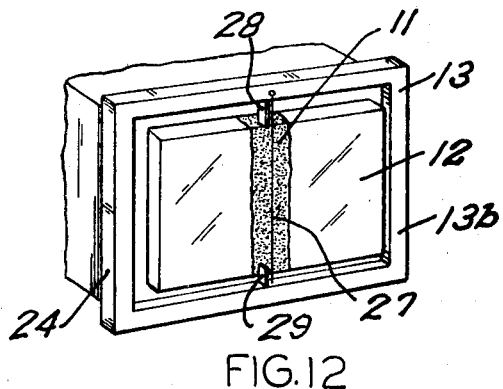
Figure 11:
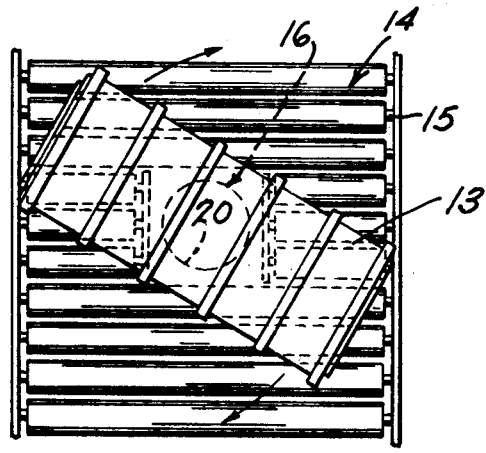
Figure 13:
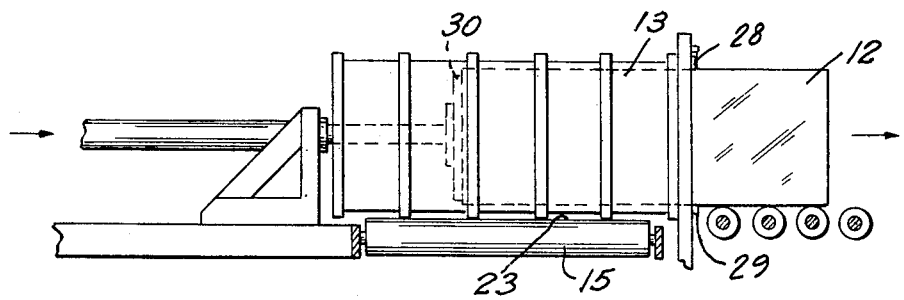
Figure 14:
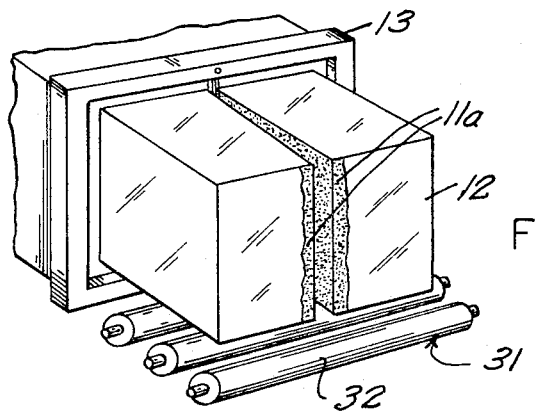
Figure 15:
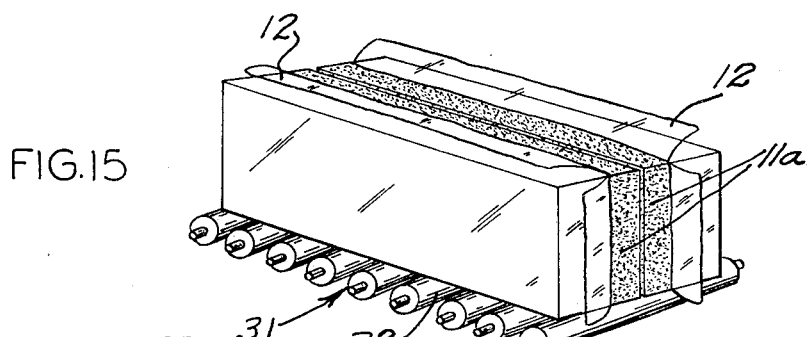
Figure 16:
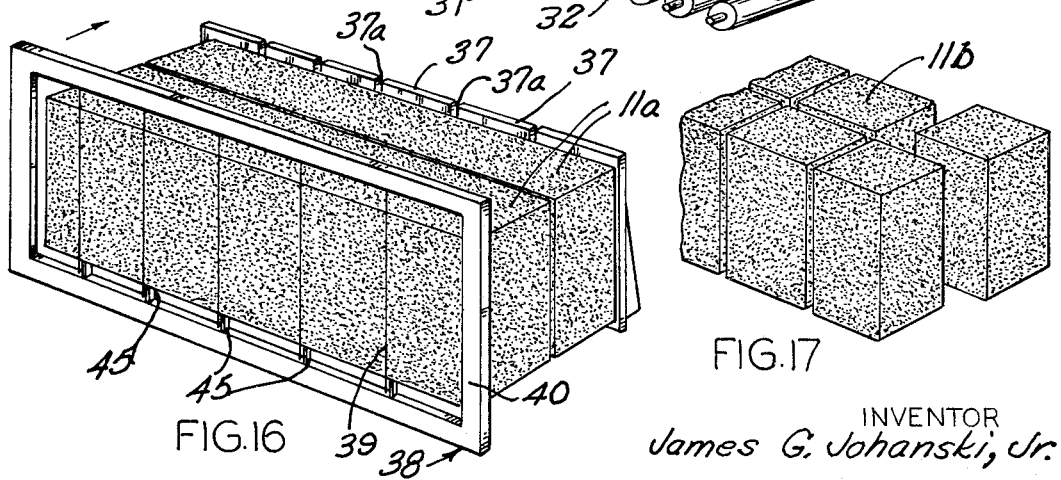
Figure 17:
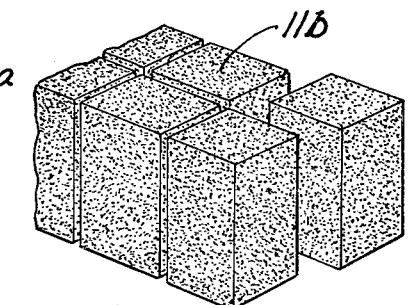

FIG. 3 is a fragmentary top plan view of my machine as shown in FIGS. 1 and 2;

FIG. 4 is an end view of the transverse cutter;

FIG. 5 is an enlarged fragmentary, partially sectioned view of a cable cylinder as connected to the transverse cheese harp or cutter;

FIG. 6 is a diagram showing the air-hydraulic circuitry for the machine illustrated in FIGS. 1–5; and FIGS. 7–17 illustrate my novel method of stripping the mold from a giant cheese block for cutting the cheese block into relatively uniform sized smaller cheese blocks. More particularly:

FIG. 7 is an isometric view of a giant cheese block mold;

FIG. 8 is an enlarged fragmentary side view of the mold on the transverse conveyor illustrating the method of removal of the mold end covers;

FIG. 9 is an enlarged fragmentary perspective view of one end of the mold illustrating the manner in which the film is cut from opposite ends of the giant cheese block to facilitate longitudinal cutting of the cheese block as it is removed from the mold;

FIG. 10 is a view similar to FIG. 8 only illustrating how the giant cheese block can be rotated 180° to permit the operator to remove the end cover and cut the film at the opposite end of the mold, all from the same side of the machine;

FIG. 11 is a top plan view of the transverse conveyor showing the manner of rotation of the mold;

FIG. 12 is an enlarged fragmentary view illustrating the mold and cheese block in position relative to the film cutters and the longitudinal cheese cutter in readiness for stripping the mold from the cheese and for cutting the cheese;

FIG. 13 is a side view illustrating the manner of stripping of the mold from the giant cheese block;

FIG. 14 is an enlarged fragmentary perspective view of the mold stripping and cheese block cutting operation in a more advanced state;

FIG. 15 is an enlarged fragmentary perspective view showing the cheese block after it has been cut into longitudinal pieces and after the film has been cut and is in condition to be manually stripped from the cheese pieces;

FIG. 16 is a fragmentary enlarged perspective view of the cheese pieces after the film has been stripped from the top and opposite sides of the cheese pieces in readiness for further cutting; and FIG. 17 illustrates the giant cheese block after it has been cut into smaller cheese blocks following the completion of the transverse cutting operation.

DESCRIPTION OF THE PREFERRED EMBODIMENT

The reference numeral 10 indicates a giant cheese block mold stripper and block cutting machine which is adapted to strip a giant cheese block 11 encased in a liner of impervious film 12 from a tapered cheese mold 13. The liner of film can be comprised of any suitable material. The mold may be fabricated of fiberglass and having resin-wood ribbing at spaced intervals along the end and have an O.D. of 18" x 26" x 43". A mold 12 having a giant cheese block 11 encased therein may have a gross weight of 550 pounds, whereby the mold may weight approximately 35 pounds.

The present machine 10 is so constructed that it may be operated by one person who manually moves the giant cheese molds upon heavy load bearing rollers and through the manipulation of three remote control air valves or switches, as will hereafter be discussed in further detail.

Initially, a lift truck can be employed to move the molds 13 onto a cross or transverse mold conveyor 14. The conveyor 14 has a series of spaced heavy load bearing rollers 15 for assisting the operator in the moving of the mold to a turntable or a mold rotating station 16. Prior to the operation of the mold rotator 16, the operator will cut metal straps 17 which secure mold end pieces or covers 18 and 19 to the mold 13. After the end cover 18 is removed the operator employs a knife to slit the film and to tear away a film strip 12a generally along the center line of the cheese block 11, as illustrated in FIG. 12, so that the cheese cutter or wire can freely pass through the cheese without the film causing any interference. The operator can then cause a turntable ram 20 to engage an underside of the tapered cheese mold 13 and elevate the mold off of the transverse conveyor 14. By manually rotating the mold on its supporting ram 20, the mold can be rotated 180° and then lowered onto the conveyor 14 again. The ram 20 is operated by a control valve 21 in a manner that is further described in connection with the operation of the air and hydraulic circuitry.

The operator then cuts another film strip similar to the film strip 12a, leaving an area of cheese exposed at the enlarged end 13b of the tapered mold. Initially, the operator removes the strip 12a from the smaller end 13a of the tapered mold so that when the mold 13 is rotated the large end of the mold will be placed in closest adjacency to a backup mold support or frame supporting the longitudinal cutter wire hereafter further described.

After the mold covers 18 and 19 have been removed from the mold 13 and after the film strips have been removed from opposite ends of the giant cheese block 11, the mold is then manually pushed onto a mold stripping and longitudinal cheese block cutting station, as indicated generally at 22 and as illustrated in FIG. 2. At this point, the mold 13 is supported on the rollers 15 which function to provide a mold support area 23. A mold backup frame 24 is mounted on a main frame 25. The opening defined by the tubular tapered cheese mold is aligned with the opening defined by the backup frame 24. It will be noted that the backup frame 24 has a series of pairs of wire holders 26 to permit a desired number of longitudinal cutters or wires 27 to be supported thereon. The backup frame 24 is clearly shown in FIG. 12. Mounted in alignment with the wires 27 are a pair of film knives 28 and 29 which function to cut the film along top and bottom sides of the cheese block 11 to permit the cheese cutter or wire 27 to pass through the cheese block without interference from the film.

Mounted on an opposite side of the mold 13 at the mold stripping station 22 is a ram 30 which is sized for engagement with the giant cheese block 11 for forcing the cheese block out of the mold 13 and against the film cutter 28 and 29 and then against the cheese cutter 27 for dividing the cheese block into cheese pieces 11a—11a as shown in FIG. 15. If it is desired to divide the cheese block 11 into additional longitudinal cheese pieces, additional wires 27 can be mounted between the wire supports, as indicated at 26 in FIG. 1. In order to insure that the cheese block 11 is completely cut into longitudinal pices 11a—11a, the ram 30 is provided with a series of vertical grooves 30a which are in alignment with the cheese cutting wires 27 so that when the ram is brought into proximity with the wires 27 the wires 27 can pass completely through the downstream end of the cheese into the grooves 30a to complete cut the cheese into severed sections 11a—11a.

In the mold stripping and cutting operation the giant cheese block mold is restrained against frame 24 which supports the cutting wire 27 and the film slitters 28 and 29, thus permitting the giant cheese block to be removed from its mold 13 into one or three severing or cutting wires 27 as it is being propelled by the ram 30. As the giant cheese block 11 moves through the cutting wires, the film slitters 28 and 29 are slitting into the film on the top and bottom of the giant cheese block as shown in FIG. 12.

As soon as ram 30 completes its full stroke, completely removing and severing the giant cheese block into two or four sections, it is retracted by reversing the ram direction control valve 35.

The empty giant cheese block form is then rolled to a discharge side 14a of the transverse conveyor 14 so the mold can be conveyed to empty mold storage.

The ram 30 is operated by actuating the pressure selector valves 34 so the oil from the air oil high-pressure booster flows in ram 30 and moving the ram direction control 35 to a forward position, ram 30 comes in contact with giant cheese block within giant cheese block form exerting a force of 1,640 p.s.i. (maximum) oil pressure with an initial working force of 80 p.s.i. air pressure.

As the cheese pieces 11a—11a are cut they are deposited on a longitudinal conveyor 31 that is comprised of a series of rollers 32. The rollers 32 are mounted in such a way that the force of the ram can function to push the cheese so that the cheese can be readily rolled on the rollers 32 and deposited at the second cheese or block cutting station 33.

The frame 10 has a slotted backup frame 37 positioned at one side of the longitudinal conveyor 31 for coaction with a harp or transverse cheese cutter 38 mounted at an opposite side of the conveyor 31. The harp 38 has a series of wires or cheese cutting knives 39 which are mounted on a rectangular open type frame 40 and a series of film curing knives 45 mounted on the frame in alignment with the wires 39 for slitting the film at the bottom side of the longitudinal cheese pieces 11a in advance of cheese cutting by the wires 39.

Mounted between the longitudinal conveyor 31 is a power means comprising a cable cylinder 41 having a cable 42 attached to an underside of harp frame 40 as indicated at 43—43 in FIG. 5. The harp frame 40 is suspended on ball bushing assemblies which, in turn, are supported on guides or guide shafts 44 that are carried on the frame 25. Thus, when the longitudinal pieces 11a are properly positioned on the longitudinal conveyor 31 the ram 41 can be caused to operate and move the harp 38 transversely of the longitudinal conveyor to divide the longitudinal pieces into a series of generally uniform sized blocks 11b as indicated in FIGS. 16 and 17. It will be noted that the backup plate or frame 37 has a series of slots 37a which are transversely aligned with the transverse cutting wires or knives 39 to permit the wires to pass freely through the cheese pieces 11a—11a so that the edges on the cheese blocks 11b will be sharply defined and free of jagged areas.

The giant cheese block now rests on rollers above hydraulic cable cylinder 41 and has been severed into two or four sections across its height and through its length. At this point the slit film sections are removed manually on the two sides and top.

In order to operate the ram 41a for final cutting, the pressure selector valve 34 is positioned to permit the ram pressure selector valve 35 to switch and also the high air pressure valve to shut off, thus permitting low pressure of 50 p.s.i. to enter the air-oil booster to actuate ram 41a of the cable cylinder 41, in turn driving the harp 39 on its ball bushing assemblies 43, connected by the tie bar as shown in FIGURE 3 thus forcing the bottom film slitters and the harp wires 39 through the height and width of the giant block. The cut or severed sections 11b are then rolled or placed on a conveyor (not shown) carrying them to a final shaping or cutting station. The ram directional valve 35 is then reversed thus returning ram 41a to its original position and the complete process is repeated for the removal of the giant cheese blocks from the molds or forms. The film remaining on the lower side can be stripped away from the smaller blocks 11b at the final cutting and packaging station (not shown).

Any one of the 40 smaller blocks 11b can be conveniently cut into cheese units having the following sizes for final packaging:

CONSUMER SIZE PACKAGES, E.G., CHEDDAR CHEESE

|  | L. | W. | H. |
|---|---|---|---|
| 18/8 oz. Snack Bar | 3¾ | 2 1/16 | 1¾ |
| 12/12 oz. Snack Bar | 5½ | 2 3/32 | 1¾ |
| 12/12 oz. Chunk | 4¾ | 2⅞ | 1¾ |
| 24/12 oz. Chunk | 4¾ | 2⅞ | 1¾ |
| 12/16 oz. Chunk | 5½ | 2¾ | 1¾ |
| 12/20 oz. Loaf | 5½ | 3⅝ | 1¾ |
| 24/12 oz. Longhorn | 5½ | 3⅜ | 1 5/16 |
| 24/16 oz. Longhorn | 5½ | 3⅜ | 1¾ |
| 16/10 oz. Slices | 3½ | 3½ | 1⅜ |
| 18/6 oz. Burger Slices | 2⅞ | 2⅞ | 1⅜ |
| 12/12 oz. Club | 4⅜ | 2½ | 1¾ |
| 12/14 oz. Chunk | 4 5/16 | 3 | 2¾ |
| 9/28 oz. Loaf | 7 | 3 15/16 | 1 7/16 |

The final packaging operation can be carried out on conventional horizontal packaging machines such as a Hudson-Sharp cheese packaging machine or a Hayssen RT machine, among others, which are all well known in this art.

AIR AND HYDRAULIC CIRCUITRY

In FIG. 6 is shown a half inch air filter 60 and adjacent to this air filter is a half inch lubricator 61 connected with line or pipe 62 keyed through to pipe 63 to another regulator 64 which may be a half inch regulator set at 50 pounds p.s.i. The regulator 64 is connected to a half inch swing check valve 65.

The lubricator 61 provides means to lubricate the air cylinders and the diaphragms and other mechanisms in the systems illustrated. The system, as illustrated, can be operated by 150 pounds p.s.i. which would be in fed to the filter 60. Beyond the T juncture of the lines 62 and 63 the line 62 is connected to a half inch regulator 66 which may be set at 80 pounds p.s.i. The regulators are also provided with 0- to 200-pound air pressure gauges to identify the pressure within, as indicated at 64a and 66a.

The illustrated system is set up with two air pressures with one being a high pressure known as 80-pound pressure and the other being a low air pressure at 50 pounds pressure. The reason for having a multiple pressure system is to save or conserve air in the system and because a reduced hydraulic pressure is needed when operating the low pressure cable cylinder 41 as well as the high pressure ram 30. The system further includes a remote controlled valve 67 which may be a Miller No. 310 with a No. 104 subplate, half-inch pipe size. This valve 67 would remain open to permit the 80 pounds p.s.i. pressure to flow through line 68 to tank 70.

The valve 67 is a remote controlled valve controlled by the ram selector valve 34 which may be a Miller valve No. 504. Valve 67 is air activated and is activated by valve 34. The valve 34 is called a ram selector, and it selects either ram 30 or ram 41. The location of the control handle on valve 34 permits air to flow through valve 67 or shuts off the flow of air through valve 67 from pressure regulator 66. If valve 67 is shut off by the ram selector valve 34 being in position for operating ram 41, then the air from line 62 would flow into line 63 through the swing check valve 65, around valve 67, and through pipeline 69. The air thus bypasses valve 67 and flows at a reduced pressure (50 pounds) into the air oil tank 70 and/or valve 71 and booster cylinder 72. The 50-pound air pressure flow flows through an air operated air valve 73 and can flow into either valve 73 and into air oil tank 70 or the air pressure can flow into valve 71 and into the air cylinder or booster 72, depending upon the selection by the ram directional valve 35, either forward or reverse.

As stated before, the ram 41 carries the wire frame through the length of the cheese, diving it into 40-pound, 20-pound, or 10-pound blocks, and ram 30 removes the cheese from the mold, splits or quarters it, and also cuts the film. In order to operate the machine 10, the operator can activate selector valve 34 by moving the ram handle in position to operate the ram 30. After the machine is loaded with a mold, ram direction valve 35 in put in a forward position and air is thereby permitted to flow from the pipeline 62 through 80 pound pressure regulator 66, through Miller valve 67 and into line 75. Because the ram directional valve 35 is in the forward position, the valve 71 is open permitting air to enter the booster 72. The air pressure on the booster 72 forces oil out of cylinder 76 past 0- to 5000-pound p.s.i. gauge 77 through hydraulic line 78 into high pressure circuit diverter valve 79. When the ram selector valve 34 is in position for operating the ram 30, air cylinder 80 locates valve 79 so that high pressure oil from booster 72 and cylinder 76 can flow through pipeline 81 into the cylinder 30, thus forcing the ram against the cheese product. As the cheese is removed by the ram 30 from the mold or form, the ram directional valve 35 is located in the reversed position thereby releasing the valve 71 and exhausting through a Miller No. 910 speed control muffler 82, removing the air from cylinder 72 and activating the valve 73 and permitting air to flow into the Miller air oil tank 70, and for the air forcing the oil through line 83 and into line 84 forcing the piston back through the cylinder 30, and also forcing the high pressure oil back in the line 81 to the valve 79 into the line 78 and back into the oil section of the pressure booster 76. This, of course, is a retraction movement of the ram in cylinder 30. The film is then stripped from the cheese block and the cheese block is either split in two or quartered through its length. The block is located by hand in front of the transverse backup plates which are activated by using ram selector control or valve 34 and putting it in position for ram 41. The ram selector valve 34 when in position permits the air cylinder 80 to move the circuit diverter 79 in a position to let oil from booster 76 through line 78 into oil line 85 and thus into cable cylinder 41.

To activate the ram of cylinder 41, the ram selector valve 34 should be moved into position for ram 41 by activation of 34a which is a hand lever. The ram selector valve 34 also activates air valve 67, closing off the 80-pound pressure circuit permitting the swing check valve 65 to open and thus let the 50-pound pressure to pass from regulator 64 to permit the 50-pound circuit to operate. This is done primarily since extremely high pressure is not required to operate the cable cylinder 41 and to conserve air, thereby minimizing air consumption and cost of operation. Upon activating ram selector valve 34 with hand lever 34a, the circuit diverter 79 is operated through lever 79a by the air cylinder 80, and it diverts the flow by activating or extending the cylinder and thus changing the flow of high pressure fluid through line 78 from booster 72 and oil from section 76 of booster 72 through line 78 through the line 85 instead of the line 81, the oil flowing through line 85 from line 78 and through to the cable cylinder 41, thereby causing the ram 41a to move the harp transversely through the product.

Upon operation of the valve 35 by handle 35a in a reverse direction, air valve 73 is activated and air valve 71 exhausts the air pressure in the booster 72. The valve 73 permits 80 pounds air pressure to bear against the oil in tank 70 and thus causes the piston 41a to retract with the harp.

It will be appreciated that since heavy pressures are required to discharge the product from the mold of the order of 3100 p.s.i. that heavier gauge cutting wires 27 are required in order to cut the product as it emerged from the mold and in order to be able to stand up under these pressures. To this end, the cutting wires such as cuttings wires 27 and 39 may be .059" in diameter as opposed to .032", as normally used.

Although minor modifications might be suggested by those versed in the art, it should be understood that I wish to embody within the scope of the patent warranted hereon, all such modifications as reasonably and properly come within the scope of my contribution to the art.

I claim:

1. A method of cheese handling comprising the steps of:
   removing end panels from opposite ends of a cheese mold having a molded cheese therein,
   cutting film strips off opposite ends of the molded cheese,
   forcing the molded cheese from the mold while longitudinally cutting the film along top and bottom sides of the molded cheese and cutting the molded cheese into elongated cheese pieces along the longitudinal lines of the cut of the film,
   stripping the exposed film from the top side and adjacent sides of the cut pieces,
   securing the elongated cheese pieces at one side against movement, and
   transversely cutting the cheese pieces while cutting the film at a bottom side of the pieces thereby dividing the pieces into cheese blocks of approximately the same size.

2. A method of cheese handling comprising the steps of:
   removing end panels from opposite ends of a tapered cheese mold having a molded cheese therein,
   cutting film strips off opposite ends of the molded cheese,
   forcing the molded cheese from the smaller end of the tapered mold while longitudinally cutting the film along top and bottom sides of the molded cheese into elongated cheese pieces along the longitudinal lines of the cut of the film,
   stripping the exposed film from the cut pieces,
   securing the elongated cheese pieces at one side against movement, and
   transversely cutting the cheese pieces while cutting the film at a bottom side of the pieces thereby dividing the pieces into cheese blocks of approximately the same size.

3. A method of cheese handling comprising the steps of:
   cutting a film strip off one end of a molded cheese while in a cheese mold,
   rotating the cheese mold 180°,
   cutting a film strip off an opposite end of the molded cheese, forcing the molded cheese from the mold while longitudinally cutting the film along top and bottom sides and cutting the molded cheese into elongated cheese pieces along the longitudinal lines of the cut of the film,
   stripping the exposed film from the sides of the cut pieces,
   securing the elongated cheese pieces at one side against movement, and
   transversely cutting the cheese pieces while cutting the film at a bottom side of the pieces thereby dividing the pieces into cheese blocks of approximately the same size.

4. A method of cheese manufacture and handling comprising the steps of:
   forming a molded giant cheese block in a cheese mold having a liner of film at one plant and closing the mold,
   shipping the molded cheese in the cheese mold to a packaging plant after the cheese has been cured for stripping of the cheese mold from the giant cheese,
   removing end covers from opposite ends of a cheese mold having a giant cheese block therein,
   cutting film strips off opposite ends of the giant cheese block, forcing the giant cheese block from the mold while longitudinally cutting the film along top and bottom sides of the block and cutting the block into elongated cheese pieces along the longitudinal lines of the cut of the film,
   stripping the exposed film from the top and adjacent sides of the cut pieces,
   supporting the elongated cheese pieces at one side against movement, and transversely cutting the cheese pieces while cutting the film at a bottom side of the pieces thereby dividing the pieces into smaller cheese blocks of approximately the same size.

5. A cheese block handling and cutting machine comprising:
   a frame,
   a first cheese cutting station on the frame including first backup means for engagement with one end of a giant cheese mold,
   support means for supporting the giant cheese mold in adjacency to said first backup means,
   longitudinal cheese cutter means positioned relative to the support means for longitudinally cutting the giant cheese block as it emerges from the giant cheese mold,
   film cutting means in alignment with said longitudinal cheese cutter means for cutting film encasing the giant cheese block in advance of cutting the cheese to allow free unobstructed cutting of the block by said longitudinal cheese cutter means,
   reciprocating ram means positioned for engagement with the giant cheese block at an opposite end of the giant cheese mold for moving the block out of the mold and against the longitudinal cheese cutter means for dividing the block into a series of longitudinal pieces, and
   a second cheese cutting station including cheese support means for supporting the cut cheese pieces, second backup means at one side of the cheese pieces, transverse cheese cutter means and power means for causing relative movement between the cheese support means and the transverse cheese cutter means for dividing the cheese pieces into a series of cheese blocks.

6. The machine of claim 5 further characterized by the first cheese cutting station having a transverse conveyor cooperable therewith for transporting cheese molds thereto, the support means for supporting the cheese comprising a portion of said transverse conveyor.

7. The machine of claim 6 further characterized by the conveyor having means for elevating and rotating the cheese mold 180° when the cheese mold is on the transverse conveyor.

8. The machine of claim 5 further characterized by said longitudinal cheese cutter means including a series of vertically extending transversely spaced wires positioned in opposing relationship to said reciprocating ram means and cooperable therewith for dividing the cheese into a series of longitudinal pieces and with the cut longitudinal pieces being moved onto the cheese support means located at an opposite side of the vertically extending transversely spaced cutter wires.

9. The machine of claim 5 further characterized by said transverse cheese cutter means being reciprocably movable transversely of the cheese support means and including a parallel sided open frame with vertically extending transversely spaced cutting wires carried thereon.

10. The machine of claim 5 further characterized by said power means comprising a cable cylinder mounted on the frame and having a cable secured with said transverse cheese cutter means for reciprocably moving the same for dividing the cheese pieces into a series of cheese blocks.

11. The machine of claim 5 further characterized by said second cheese cutting station including a second film cutting means cooperable with said transverse cheese cutter means and said power means whereby the film is transversely cut in advance of the cutting of the cheese pieces by said transverse cheese cutter means.

12. A giant cheese block mold stripper and cutter comprising:
   a transverse conveyor for receiving cheese molds having molded cheese therein,
   means for revolving the cheese molds relative to the transverse cutter,
   first backup means cooperable with one end of the cheese mold,
   means for forcing the molded cheese from the mold from its opposite end,
   cheese cutter means for cutting the molded cheese as it emerges from the cheese mold,
   a longitudinal conveyor for receiving the cheese pieces as they are cut,
   second backup means at one side of the longitudinal conveyor coacting with one side of the cheese pieces to facilitate cheese block cutting,
   transverse cheese cutter means positioned at an opposite side of the cheese pieces, and
   power means for moving the transverse cheese cutter means through the cheese pieces to form cheese blocks.

13. In a method of handling and dividing blocks of semi-soft material such as cheese, the steps of:
   first cutting film strips off opposite ends of a cheese block encased in an impervious film,
   bodily moving the cheese block in one direction,
   using said bodily movement to forcibly cut film slits on opposite sides of the block and to cut the block at the area of the film slits into at least two adjoining separated pieces,
   then slitting the film on at least a bottom side of the pieces and contemporaneously transversely cutting the cheese pieces along the transverse film slits to divide each piece into a series of individual smaller blocks.

14. In a method of handling and dividing blocks of semisoft material such as cheese encased in an impervious film, the steps of:
   first cutting a film strip off one end of a cheese block and then rotating the cheese block and cutting a film strip of an opposite end,
   a bodily moving the cheese block in one direction,
   using said bodily movement to forcibly cut film slits on opposite sides of the block and to cut the block at the area of the film slits into at least two adjoining separated pieces,
   then slitting the film on at least a bottom side of the pieces and contemporaneously cutting the cheese pieces along the transverse film slits to divide each piece into a series of individual smaller blocks.

15. A giant cheese block mold stripping and block cutting machine comprising:
   a frame,
   a cheese cutting station on the frame including first backup means for engagement with one end of a giant cheese mold to prevent longitudinal movement of the mold while permitting relative movement behind the block and the mold,
   support means for supporting the giant cheese mold in adjacency to said first backup means,
   longitudinal cheese cutter means positioned adjacent the backup means for cutting the block as it emerges from the giant cheese mold,
   film cutting means positioned on said frame for cutting film encasing the giant cheese block in advance of cutting the cheese to allow free unobstructed cutting of the block by said longitudinal cheese cutter means, and
   block moving means positioned with respect to said first backup means for engagement with the giant cheese block at an opposite end of the giant cheese mold for moving the block out of the thus held mold against said film cutting means and then against the longitudinal cheese cutter means for dividing the block into a series of longitudinal pieces.

16. A cheeese block handling and cutting machine comprising:
   a frame,
   a first cheese cutting station on the frame, support means for supporting a giant cheese block, longitudinal cheese cutter means positioned relative to the support means for longitudinally cutting the giant cheese block, film cutting means in alignment with said longitudinal cheese cutter means for cutting film encasing the giant cheese block in advance of cutting the cheese to allow free unobstructed cutting of the block by said longitudinal choose cutter means, block moving means positioned for engagement with the giant cheese block at an opposite end of the giant cheese mold for moving the block against the longitudinal cheese cutter means for dividing the block into a series of longitudinal pieces, and a second cheese cutting station including cheese support means for supporting the cut cheese pieces, backup means at one side of the cheese pieces, film cutter means and transverse cheese cutter means mounted adjacent to one another with the film cutter means mounted in advance of the cheese cutter means and movable transversely of the frame, power means for causing movement of the film cutter means as well as the transverse cheese cutter means for cutting the film on the bottom side of the longitudinal cheese pieces for dividing the cheese pieces into a series of smaller cheese blocks.

17. In a method of removing a giant block of cheese having a film on its interior from a tapered mold open at opposite ends and then dividing the cheese block, the steps of positioning the end of the mold having the widest taper in closest proximity to a cutting station, and applying a telescoping force endwise to the other narrower end of the block while holding the mold stationary to separate the mold and the block while contemporaneously moving the block and longitudinally cutting the film and cutting the block into smaller units.

18. The method of claim 17 further characterized by thereafter stripping away portions of the cut film and then cutting the film on the bottom of the cheese block and thereafter transversely cutting the block to produce smaller cheese blocks.

19. A cheese block cutter comprising:

a frame, a first cheese cutting station on the frame, supporting means for supporting a cheese block or product, longitudinal cutter means positioned relative to the station for longitudinally cutting the product, block moving means positioned for engagement with the product at an opposite end for moving the product against the longitudinal cutter means for dividing the product into a series of longitudinal pieces, a second cutter station including support means for supporting the cut pieces of product, backup means at one side of the pieces, film cutter means and transverse cutter means mounted adjacent to one another with the film cutter means mounted in advance of the cheese cutter means, and power means for moving the film cutter means and the transverse cutter means for dividing the pieces into a series of smaller blocks.

20. In a method of handling and dividing a film covered block of semisoft material such as cheese, the steps of:

removing end covering portions at the ends of the mold while leaving the mold otherwise intact, positioning the forward end of the film covered block opposite and in endwise relation to a film and block cutting station, applying a force endwise to the other and rearward end of the block to forcibly and bodily eject the film covered block longitudinally out of the tubular mold, and employing the same force contemporaneously to force the film covered block through the film and block cuting station to first cut the film and to then cut the block into predetermined longitudinal strips.

References Cited

UNITED STATES PATENTS

| | | | |
|---|---|---|---|
| 695,501 | 3/1902 | Smith | 31—23 |
| 855,404 | 5/1907 | Jensen | 31—24 |
| 1,455,258 | 5/1923 | McGreer et al. | 31—23 |
| 2,189,213 | 2/1940 | MacDonell | 119—56 |
| 2,253,150 | 8/1941 | Thompson | 222—326 |
| 3,136,349 | 6/1964 | Sold | 146—78 |
| 3,354,546 | 11/1967 | Pagliuca | 31—23 |

ALDRICH F. MEDBERY, Primary Examiner

U.S. Cl. X.R.

31—14, 25; 99—243; 146—78